US006856349B1

(12) United States Patent
Trevino

(10) Patent No.: US 6,856,349 B1
(45) Date of Patent: *Feb. 15, 2005

(54) METHOD AND APPARATUS FOR CONTROLLING EXPOSURE OF A CMOS SENSOR ARRAY

(75) Inventor: Roy Trevino, Chandler, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,563

(22) Filed: Sep. 30, 1996

(51) Int. Cl.[7] .................................................. H04N 3/14
(52) U.S. Cl. ..................... 348/302; 348/297; 250/208.1
(58) Field of Search ................................. 348/294, 297, 348/298, 302, 303, 304, 305, 306, 307, 308, 371, 372, 362, 221.1, 222.1, 229.1, 230.1, 296; 250/208.1; H04N 5/335

(56) References Cited

U.S. PATENT DOCUMENTS

| | | | | |
|---|---|---|---|---|
| 4,322,752 A | * | 3/1982 | Bixby ........................ 348/312 |
| 4,573,076 A | * | 2/1986 | Tisue et al. ................. 358/212 |
| 4,706,123 A | * | 11/1987 | Chautemps .................. 348/297 |
| 5,058,190 A | * | 10/1991 | Levitt et al. ................... 382/68 |
| 5,262,871 A | * | 11/1993 | Wilder et al. ................ 348/307 |
| 5,285,286 A | * | 2/1994 | Kannegundla ................ 11/187 |
| 5,452,004 A | * | 9/1995 | Roberts ....................... 348/301 |
| 5,461,425 A | * | 10/1995 | Fowler et al. ............... 348/294 |
| 5,614,740 A | * | 3/1997 | Gardner et al. ............. 257/222 |
| 5,872,596 A | * | 2/1999 | Yanai .......................... 348/297 |
| 6,118,482 A | * | 9/2000 | Clark et al. ................. 348/308 |
| 6,155,488 A | * | 12/2000 | Olmstead .................... 235/440 |
| 6,175,383 B1 | * | 1/2001 | Yadid-Pecht ................ 348/302 |
| 2002/0089597 A1 | * | 7/2002 | Pearson ....................... 348/308 |
| 2002/0113886 A1 | * | 8/2002 | Hynecek ...................... 348/302 |
| 2002/0134911 A1 | * | 9/2002 | Zarnowski ............... 250/208.1 |

FOREIGN PATENT DOCUMENTS

WO     WO 95/01048     1/1995

* cited by examiner

*Primary Examiner*—Ngoc-Yen Vu
(74) *Attorney, Agent, or Firm*—Blakely, Sokoloff, Taylor & Zafman LLP

(57) ABSTRACT

A method for controlling the CMOS sensor array containing the first CMOS sensor cell, including the steps of receiving the clock signal and generating the first address; generating the reset signal to the first CMOS sensor cell based on the first address; calculating the read delay based on the first address and the offset value; and, generating the read address signal to the first CMOS sensor cell after the read delay. An apparatus for controlling a CMOS sensor array containing a first CMOS sensor cell, including a first logic circuit for receiving a clock signal and generating a first address; a second logic circuit coupled to the first logic circuit for receiving the first address and generating a reset signal to the first CMOS sensor cell based on the first address; a third logic circuit coupled to the first logic circuit for receiving the first address and calculating a read delay based on the first address and an offset value; and, a fourth logic circuit coupled to the first logic circuit for generating a read address signal to the first CMOS sensor cell after the read delay.

21 Claims, 9 Drawing Sheets

METHOD AND APPARATUS FOR CONTROLLING EXPOSURE OF A CMOS SENSOR ARRAY

BACKGROUND OF THE INVENTION

1. Field of the Invention

The present invention relates to the field of use of image capturing using complementary metal-oxide semiconductor (CMOS) sensors. More particularly, the present invention relates to providing exposure control for CMOS sensors.

2. Description of Related Art

A video frame is composed of an array of pixels (picture elements) composed of CMOS sensor cells arranged in a grid of columns and rows—i.e. an array of CMOS sensor cells. Each cell in the array of CMOS sensor cells responds to light by storing a proportional amount of charge. The more light a CMOS sensor cell is exposed to, the more charge that CMOS sensor cell stores. For a monochrome (i.e., gray-scale) picture, the intensity of each pixel can be calculated by determining the amount of charge stored by the respective CMOS sensor cell, with a higher amount of charge representing that the CMOS sensor cell being exposed to more light. Similarly, for a color video frame, each pixel is represented by a block of three or more adjacently located CMOS sensor cells, where each CMOS sensor cell captures the intensity of one of the three colors: red, green, and blue.

For example, in a CMOS sensor cell array 2 shown in FIG. 1, each cell represents one pixel in a monochrome picture. The picture is formed by measuring the charges stored in each CMOS sensor cell, a row at a time. For example, a CMOS sensor cell [0,0], a CMOS sensor cell [0,1] and the other CMOS sensor cells of row 0 (not shown) simultaneously place their charges on a data signal line D0, a data signal line D1, and the other data signal lines of CMOS sensor cell array 2 (not shown), respectively, when a read signal is applied to row 0 signal line. Moreover, CMOS sensor cell [0,0], CMOS sensor cell [0,1] and the other CMOS sensor cells of row 0 are simultaneously drained of their charges when a reset signal is applied to reset 0 signal line. Thus, the charge in CMOS sensor cell [0,0] is output when a read signal is applied to row 0 signal line and the charge in CMOS sensor cell [0,0] is reset (i.e., cleared) when a reset signal is applied to reset 0 signal line.

Each row signal line and each reset signal line is reached through an AND gate (i.e., each row signal line and each reset signal line is connected to the output of an AND gate). The two AND gates for each row share a common input such that the row signal line and reset signal line for each row are addressable by a single address signal line. For example, row 0 signal line and reset 0 signal line are accessible only when addr 0 signal line receives an address signal with a logical value of "1", allowing AND gate 8 and AND gate 10 to allow the signals on rowgen signal line 12 and rstgen signal line 14, respectively, to be passed through to row 0 signal line and reset 0 signal line, respectively. Conversely, no row can be reset or read unless the associated address signal line has a logical value of "1" as otherwise the AND gates for the row will not allow any signals to pass.

FIG. 1, a "post-capture" circuit utilizing analogto-digital (A/D) converters and digital latches is used to generate each frame of the image as follows. First, the amount of charge contained in each CMOS sensor cell is "digitized" to obtain a quantified amount by A/D converters. The output of each A/D converter is fed into the first digital latch of a series of digital latches, the set of values shifting over as every row is captured.

The measurement of the charge for each of the cells is. converted from an analog level to a digital level through the use of a single analog-to-digital converter for each column. Thus, A/D 16 is responsible for converting the level of charge contained in CMOS sensor cell [0,0] after the charge has been placed on data signal line D0, as described above, from an analog signal to a digital value. This digital value is stored in a digital latch 18. As there are four rows in CMOS sensor cell array 2 (i.e. four CMOS sensor cells in each column), four digital latches per column are used to store the measured values of the set of cells in each column.

FIG. 2 is a timing/signal diagram showing the operation of the circuit of FIG. 1. rowgen signal line 12 and rstgen signal line 14 receives regular clock pulses, while access 0 signal line, access 1 signal line, access 2 signal line, and access 3 signal line are "strobed" cyclically. The values appearing on the row signal lines of each row is the logical AND of the values on rowgen signal line 12 and the respective address signal line (i.e., access 0 signal line, access 1 signal line, acces 2 signal line, and access 3 signal line). Similarly, the values appearing on the reset signal lines of each row is the logical AND of the values on rstgen signal line 14 and the respective address signal line.

For example, referring to FIG. 2, at time t1, access 0 signal line undergoes a low to high signal transition after which rowgen signal line 12 also undergoes a low to high signal transition. The resulting AND operation performed by AND gate 8 produces a logical "1" at row signal line 4, which causes the CMOS sensor cells of row 0 to output their charges onto the data signal lines to be converted by the associated A/D converters.

After rowgen signal line 12 undergoes a high to low signal transition, rstgen signal line 14 undergoes a low to high signal transition. The resulting AND operation performed by AND gate 10 produces a logical "1" at reset 0 signal line, which causes the CMOS sensor cells for row 0 to be drained of their charges and, thus, be ready to accumulate charge again.

At time t2, at the transition of rstgen signal line 14 from a high to low signal, CMOS sensor cell [0,0] has been completely discharged. Thereafter, access 0 signal line undergoes a high to low signal transition, which will prevent any value transitions on rowgen signal line 12 and rstgen signal line 14 from affecting row 0 signal line and reset 0 signal line, respectively, until time t3, as described below.

From the high to low signal transition of access 0 signal line immediately after time t2 to time t3, the other address signal lines (i.e., access 1 signal line, access 2 signal line, and access 3 signal line) also undergo the same transitions in sequence, which affects the row signal line and the reset signal line of each corresponding row in the manner described above.

At time t3, when access 0 signal line undergoes a low to high signal transition again, the CMOS sensor cells for row 0 has accumulated charge from time t2 to time t3. The CMOS sensor cells for row 0 accumulate charge until time. t4, when the charge for each CMOS sensor cell is read out as described above. Thus, the total charge accumulation time is from time t2 (when the CMOS sensor cells of row 0 are reset) to time t4 (when the CMOS sensor cells of row 0 are read). This charge accumulation time is equal for every cell in every row as the transitions for rowgen signal line 12, rstgen signal line 14, access 0 signal line, access 1 signal line, access 2 signal line and access 3 signal line have the same respective frequency and only differ as to their periods.

The amount of charge stored by each CMOS sensor cell is proportional to the amount of time the CMOS sensor cell is exposed to light. As the amount of charge each CMOS sensor cell is capable of storing is limited, the amount of time each CMOS sensor cell is exposed to light is limited at the upper end by the amount of storable charge (i.e. charge accumulation time is limited in a practical sense by the amount of storable charge). In order for CMOS sensor cell array 2 to be able to operate under a variety of lighting conditions, the amount of time for which CMOS sensor cell array 2 is exposed to light has to be controlled. Otherwise, in highly lit situations such as the outdoors during a sunny day, all the CMOS sensor cells would be saturated, returning a white picture. Similarly, in lowly lit situations such as during evening periods, all of the CMOS sensor cells would return very little charge, resulting in a substantially black picture.

To compensate for the former situation, the CMOS sensor cells can be made less sensitive to light (i.e., the CMOS sensor cells stores charge slowly under all conditions). However, this would exacerbate the problem of the CMOS sensor cells not being "sensitive" enough under low-light conditions. Thus, preferably, the CMOS sensor cells are manufactured to be sensitive to low-light situations and, for highly lit situations, are "protected" from too much exposure to light through the use of an iris.

Normally, the iris can grossly adjust the amount of light that is allowed to reach CMOS sensor cell array 2. Thus, the iris can control the amount of light reaching CMOS sensor cell array 2 in any charge accumulation period. However, under many circumstances, this amount of adjustment is not accurate enough, therefore still resulting in either over-exposure or under-exposure of the CMOS sensor cells. For example, in video capturing applications (when frame rates are currently targeted at approximately 30 frames per second), the targeted range of exposure time for CMOS sensor cell array 2 is from a minimum time of 1/30th of a second and lower, (i.e., 30 Hz and up). At these rates, it would not be sufficient to just use the gross adjustment provided by an iris.

Therefore, to compensate for any adjustments necessary due to the inadequacy of the iris, the post-capture circuitry is set to operate at a rate high enough to effectively allow each frame to be captured (i.e., each row to be processed) before the CMOS sensor cells become saturated due to over-exposure.

However, with current CMOS sensor cell technology, the amount of time required to capture and process a row (i.e., the amount of time required for the charge contained in each CMOS sensor cell to be measured by an A/D converter) is fixed and relatively large in comparison to the desired minimum exposure time. Thus, there is a limit to the speed of operation of the post-capture circuitry.

One solution that has been proposed is to increase the speed of operation of the post-capture circuitry to capture each row at the desired speed. However, assuming what is desired is a capture resolution at 1,000 rows of 1,000 CMOS sensor cells per row (i.e., 1,000×1,000 resolution), there would need to be 1,000 rows that would need to be processed every 1/30th of a second on the low end, 1/xth of a second on the high end (where x can be any number required to capture the image, and can be on the order of hundreds, and thousands, even higher numbers). Although CMOS sensor cells can be made sensitive enough to capture at the required rates, to increase the speed of the post-capture circuitry to be able to process the incoming data at the required rate would be prohibitively expensive.

In addition, this increased speed is unnecessary as the required frame rate is only 30 frames per second. Thus, any operation rate higher than 30 Hz (i.e. 1/30th of a second) would be unnecessary for most products in question.

What is required, therefore, is a uniform control for a wide range of exposure times on a per row basis given a fixed frame capture time. This means that for a given frame rate, the exposure time for the CMOS sensor array can be any arbitrary period such that, if the situation requires, the frame rate can remain constant while only the exposure time of each frame is varied (i.e., even though a frame needs to be captured every 1/30th of a second), the exposure time would be controllable to be a period shorter than the 1/30th of a second period.

SUMMARY OF THE INVENTION

In providing for variable exposure time for each row of CMOS sensor cells in a CMOS sensor cell array such as CMOS sensor cell array 2 of the type shown in FIG. 1, a pair of rotating "pointers" are generated to INDEPENDENTLY trigger the resetting and reading-out of the charges contained in each cells of each row of CMOS sensor cells. For any given row of CMOS sensor cells, a first pointer is generated that will reset the charges contained in each CMOS sensor cell of that given row—"opening the shutter". Then, after a predetermined period, a second pointer is generated that will cause the sampling of the charge contained in each CMOS sensor cell of the same given row.

A method for controlling the CMOS sensor array containing the first CMOS sensor cell, including the steps of receiving the clock signal and generating the first address; generating the reset signal to the first CMOS sensor cell based on the first address; calculating the read delay based on the first address and the offset value; and, generating the read address signal to the first CMOS sensor cell after the read delay.

The invention is used to control a CMOS sensor array. The invention uses a first logic circuit to receive a clock signal and generates a first address. A second logic circuit receives the first address and generates a reset signal to the first CMOS sensor cell based on the first address. A third logic circuit receives the first address and calculates a read delay based on the first address and an offset value. A fourth logic circuit generating read address signal to the first CMOS sensor cell after the read delay.

In a preferred embodiment of the invention, the first logic circuit is an address generator, the second logic circuit is a first address decoder, the third logic circuit is an adder, and the fourth logic circuit is a second address decoder.

DETAILED DESCRIPTION OF THE INVENTION

The present invention provides a method and apparatus. for exposure control of CMOS video sensor arrays. For purposes of explanation, specific embodiments are set forth to provide a thorough understanding of the present invention. However, it will be understood by one skilled in the art, from reading this disclosure, that the invention may be practiced without. these details. Further, although the present invention is described through the use of CMOS sensor cells, most, if not all, aspects of the invention apply to sensor cells in general. Moreover, well-known elements, devices, process steps and the like are not set forth in detail in order to avoid obscuring the present invention.

Figure 1:
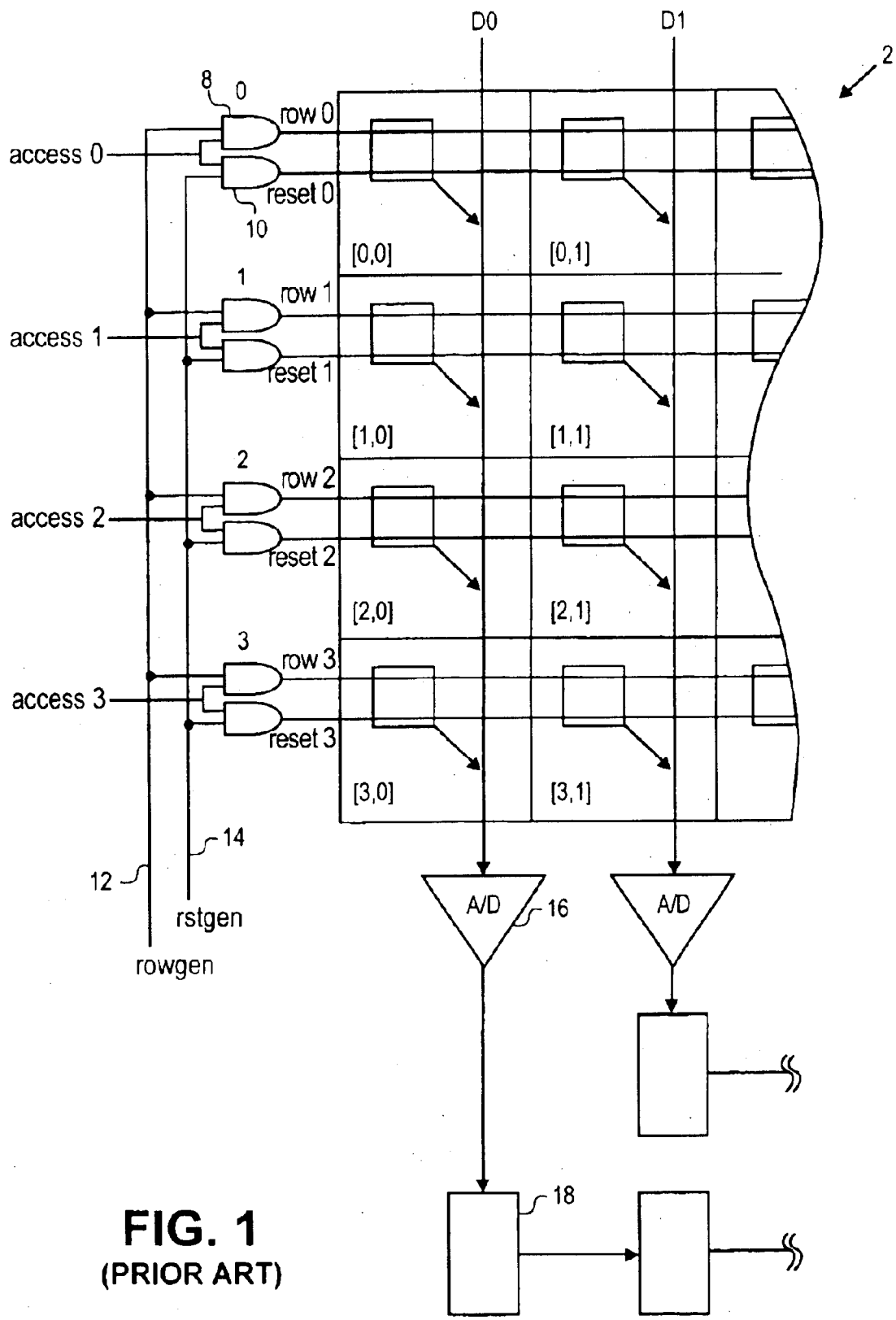
FIG. 1 illustrates a prior art CMOS sensor cell array and associated post-capture processing circuitry.
Figure 2:
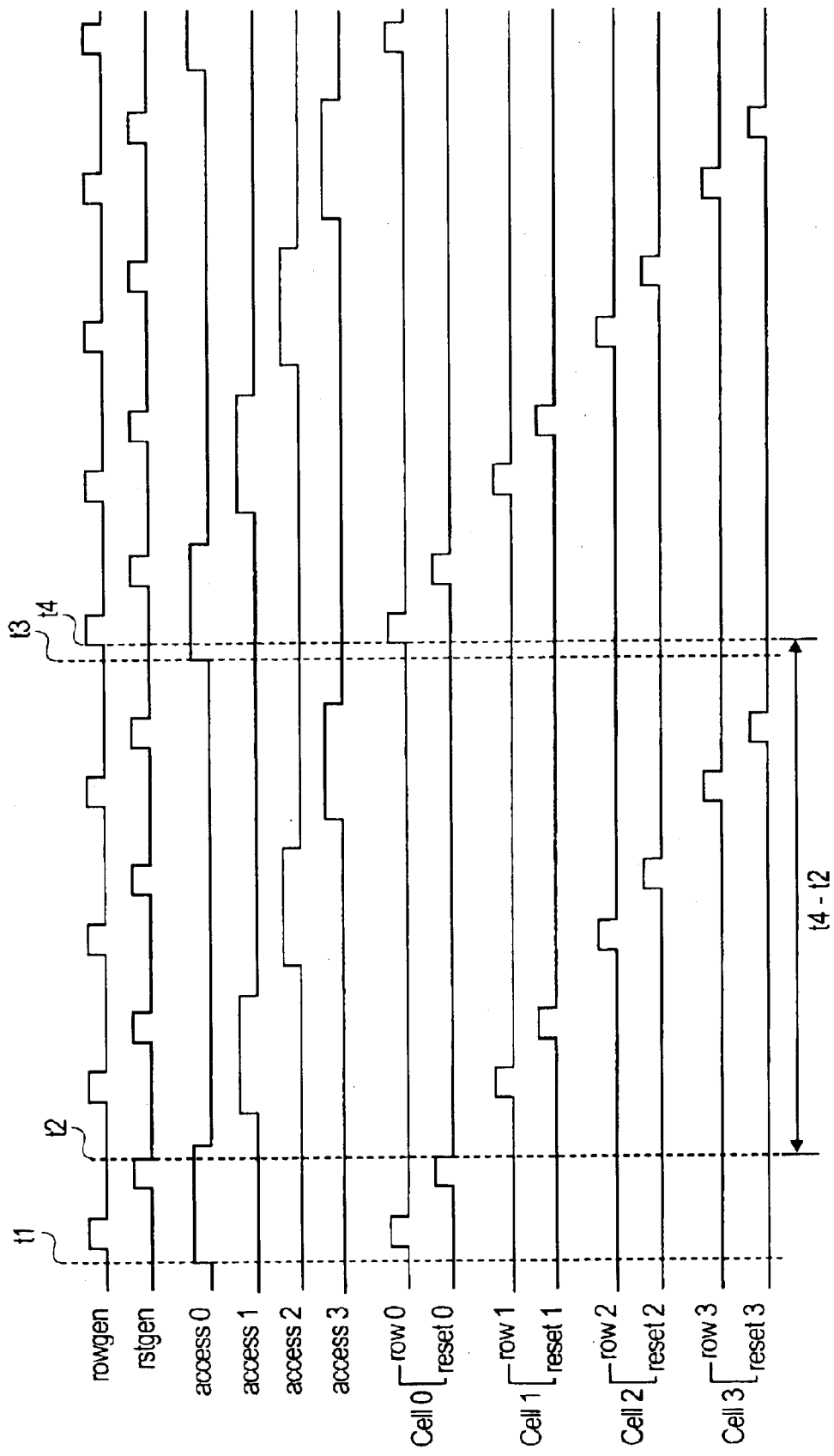
FIG. 2 illustrates a timing/signal diagram generated during the operation of the prior art circuit of FIG. 1.
Figure 3:
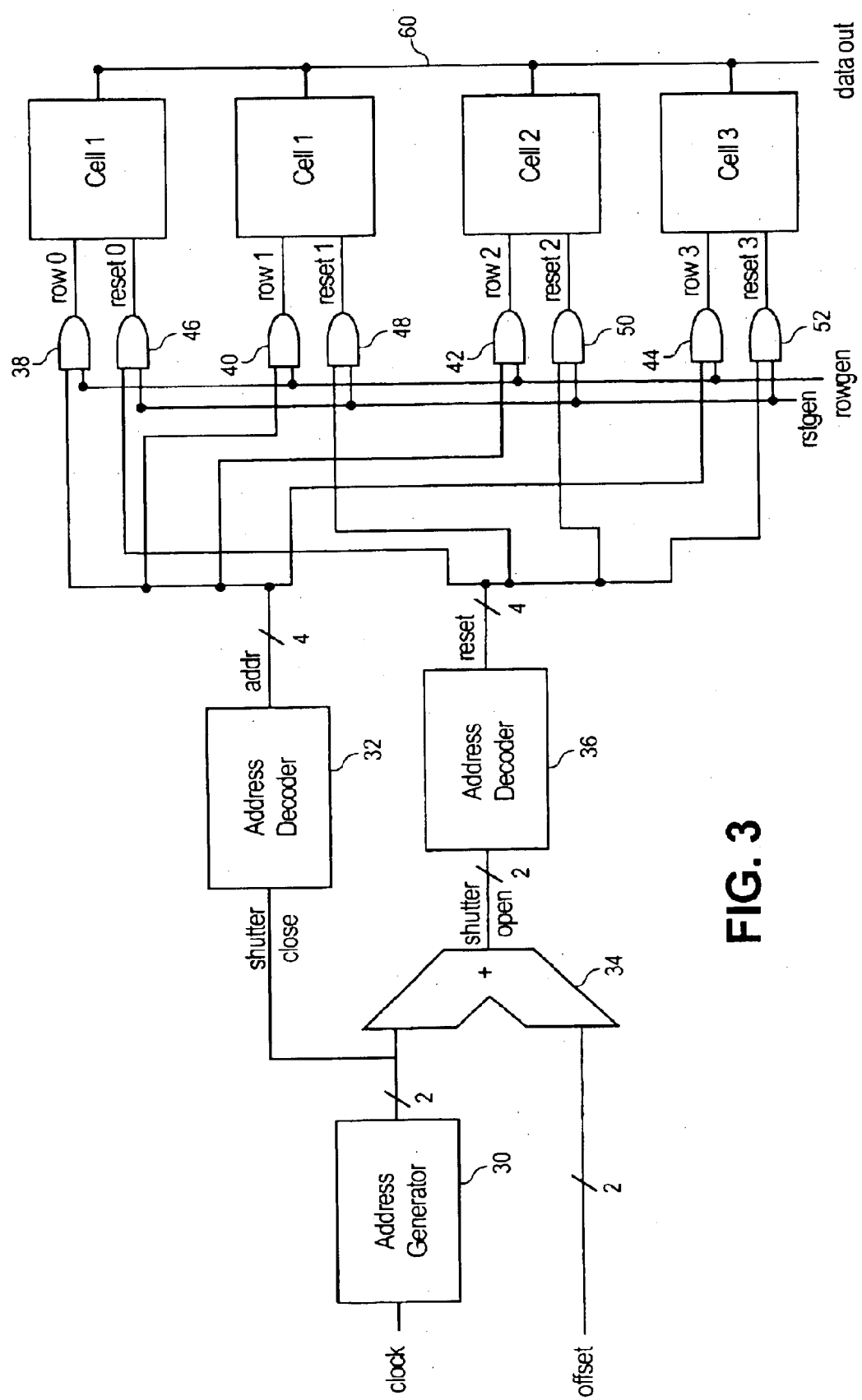
FIG. 3 illustrates a block diagram of an exposure control system configured in accordance with a preferred embodiment of the present invention.

FIG. 3 illustrates a block diagram of a system configured in accordance with a preferred embodiment of the invention which contains an address generator 30; a first address decoder 32; an adder 34; a second address decoder 36; a set of AND gates 38, 40, 42, and 44; and a set of AND gates 46, 48, 50, and 52, for use in controlling the reading and resetting of CMOS sensor cell 0, CMOS sensor cell 1, CMOS sensor cell 2 and CMOS sensor cell 3, respectively. The charge of each CMOS sensor cell is transported over a data out line 60.

In the following description, for simplicity of explanation, only the first column of a CMOS sensor cell array (i.e., only the first CMOS sensor cell of each row) having four rows of CMOS sensor cells will be used.

Adress generator 30 is coupled to a clock pulse generator (not shown) and generates the binary sequence of "00, 01, 10, 11" repeatedly, with one address per clock cycle received. In the preferred embodiment, address generator 30 is a modulo-4 counter that cycles from binary "00" to binary "11".

Adder 34 receives the value of the binary output generated by address generator 30 and adds an offset value from binary "00" to binary "11". In the preferred embodiment, adder 34 is a modulo-4 adder which outputs a result from a modulo-4 addition of the output of address generator 30 and an offset value contained in a two bit offset register (not shown).

Thus, the output of adder 34 can be offset by a value as large as the value contained in the offset register. It is to be noted that the offset register can be of any size. Thus, in some embodiments, it would not be necessary to make the offset register a size large enough to contain a number equal to the total number of rows of the CMOS sensor cell array. Instead, the offset register only has to be a size to contain the largest offset needed by the particular implementation. In addition, as the adder used is a modulo-n adder, the result of the adder will never be larger than the modulus of the adder.

In other embodiments, the offset register can contain an address referencing the offset value contained in a memory (not shown), in which case the offset value can be of any size, as discussed above.

The value of the offset varies with the exposure time needed and can be determined by a person skilled in the art given the lighting condition, the sensitivity of the CMOS sensor array, and the particular characteristics of the implementation. For example, the offset value could be based on taking the average charge level of the CMOS sensor array for the last frame and performing a look-up in a table. Another example would be to use a light detection circuit to determine the amount of lighting in the current vicinity to be captured and determining an exposure frame (and thus an offset value) using a formula or a table.

First address decoder 32 and second address decoder 36 are used to translate a binary value to a decoded value. In a preferred embodiment, first address decoder 32 and second address decoder 36 are de-multiplexers which convert two bit binary values (i.e., binary "00", "01", "10" or "11") to a decoded decimal value (i. e. decimal "0", "1", "2", or "3")

First address decoder 32 is coupled to address generator 30 and receives the two bit binary value generated by address generator 30. First address decoder 32 has a set of four outputs, corresponding to a decimal value "0" to decimal value "3", each of which is coupled to an input of respective gate of the set of AND gates 38, 40, 42 and 44.

Second address decoder 36 is coupled to adder 34 and receives the two bit binary value computed by adder 34 from the output of address generator 30 and the value of the offset register. Second address decoder 36 has a set of four outputs, corresponding to a decimal value "0" to decimal value "3", each of. which is coupled to an input of a respective gate of the set of AND gates 46, 48, 50, and 52.

In operation, a rstgen signal or a rowgen signal will be allowed to reach a CMOS sensor cell only if the respective AND gate of the CMOS sensor cell is enabled by address decoder 36 or address decoder 32, respectively.

For example, in order for a rstgen signal to reach cell 1, address decoder 36 must output a logical "1" to AND gate 48. Similarly, in order for a rowgen signal to reach cell 1, address decoder 32 must output a logical "1" to AND gate 40.

As discussed above, when a CMOS sensor cell receives a rstgen signal, the charge contained in that CMOS sensor cell is eliminated—i.e., the CMOS sensor cell is "reset" to have no charge. After the CMOS sensor cell has been reset, it will immediately begin to accumulate charge in proportion to the amount of light to which it is exposed.

Also as discussed above, when the CMOS sensor cell receives a rowgen signal, the charge contained in the CMOS sensor cell is "read out"—i.e., placed on the data out line. It is to be noted that the CMOS sensor cell will continue to accumulate charge even after the charge has been read and digitized. This is the reason why CMOS sensor cells have to be reset to a known, zero value at the beginning of a sampling period.

FIGS. 4–8 illustrate the timing/signal diagrams generated by operation of a preferred embodiment of the invention in which the signal values of rowgen; rstgen; offset; and the outputs of address decoder 32 (labeled "addr"), and address decoder 36 (labeled "reset=addr+offset") are shown. Thus, the inputs to AND gates 46, 48, 50 and 52 are illustrated in FIGS. 4–8 as "rstgen" and "reset=addr+offset". Moreover, the inputs to AND gates 38, 40, 42 and 44 are illustrated in FIGS. 4–8 as "rowgen" and "addr".

Although the clock pulses generated by the clock as an input to address generator 30 is not shown, the result of their generation can be seen in the addr signal, and the reset signals. The shape or waveform of the clock pulses are not important, so long as they substantially create the generation of the addr signal as shown in FIGS. 4–8.

FIGS. 4–8 also illustrate the signals provided to CMOS cells 0, 1, 2 and 3, specifically: signals "row 0" and "reset 0"; signals "row 1" and "reset 1"; signals "row 2" and "reset 2";

and signals "row 3" and "reset 3", respectively. When any row signal is of a "high" value, the corresponding CMOS sensor cell receiving the signal will output its stored charge on data out line 60. Moreover, when any reset signal is of a "high" value, the corresponding CMOS sensor cell will reset—i.e., discharge—the stored charge of the CMOS sensor cell to zero.

Figure 4:
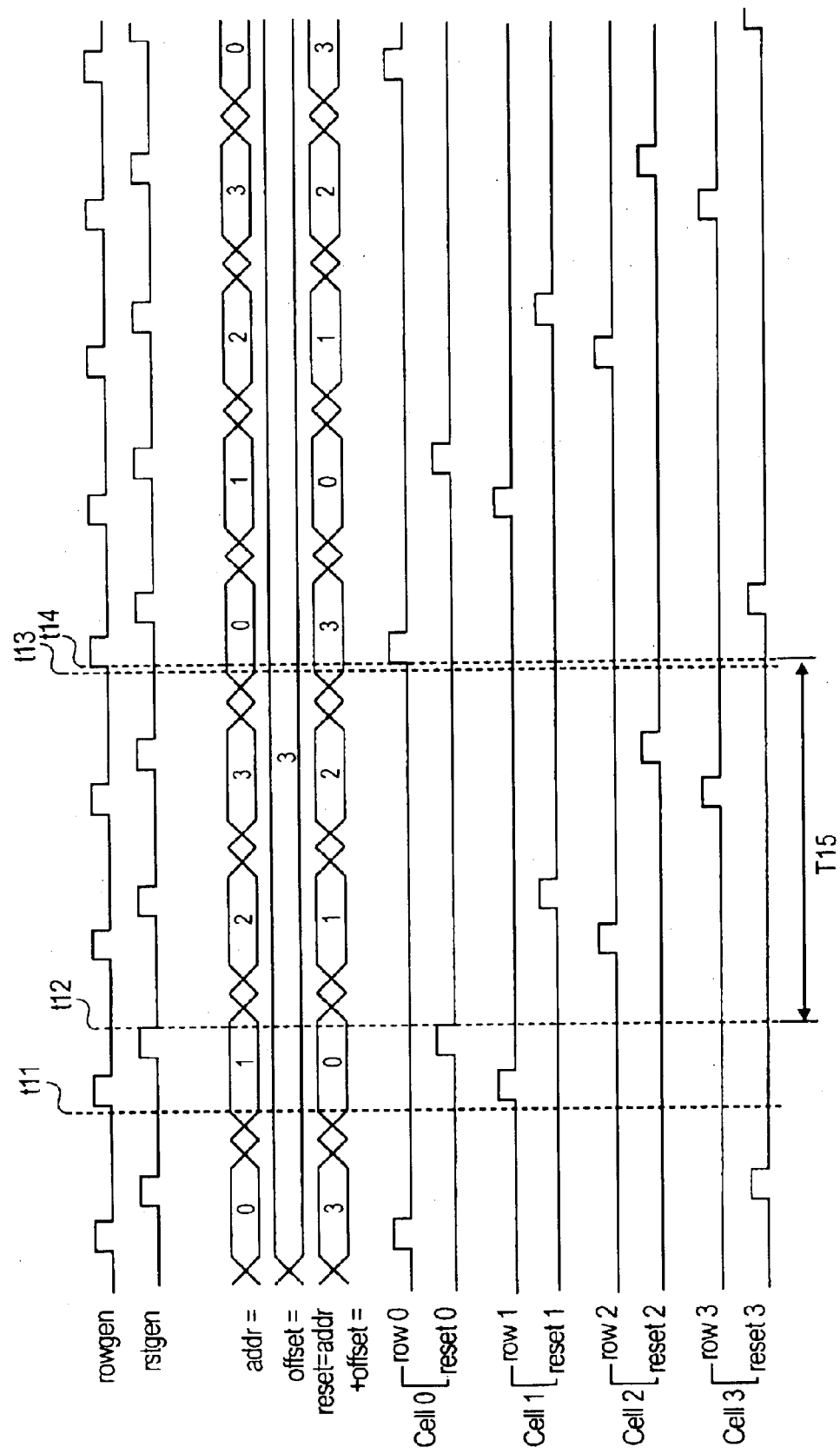
FIGS. 4–8 illustrate the timing/signal diagrams generated during the operation of the preferred embodiment of the present invention.

FIG. 4 illustrates the signal/timing diagram where a maximum delay is set between the time where the CMOS sensor cells are reset and sampled, providing the maximum exposure time in the circuit of the preferred embodiment.

In FIG. 4, the offset value has been chosen to be three clock cycles. Thus, on the third clock cycle after a CMOS sensor cell has been reset, the charge that has accumulated in the CMOS sensor cell will be read out over data out line 60.

For example, in FIG. 4, at time ti11, the value of addr is 1, and the value of offset has been chosen to be 3, as described above. Thus, the value of address decoder 36 (shown in FIG. 4 as "reset"), which is a modulo-2 sum of addr and offset, is equal to zero. Referring to FIG. 3, address decoder 32 will provide a high signal level to AND gate 40 of CMOS sensor cell 1 for the duration of the clock cycle, enabling CMOS sensor cell 1 to receive the rowgen signal. In addition, address decoder 36 also enables AND gate 46 of CMOS sensor cell 0 as the output of address decoder 36 is zero.

A short time after time t11, rowgen undergoes a low to high value change, which is passed through AND gate 40 of CMOS sensor cell 1. The output of AND gate 40, represented by row 1, therefore undergoes a low to high value change. CMOS sensor cell 1, receiving the rowgen signal, will read out its charge onto data out line 60.

At time t12, CMOS sensor cell 0 will have been held in a state of reset as the rstgen signal has been allowed to propagate through AND gate 46 to continually reset CMOS sensor cell 0. After reset 0 signal has gone from a high to low transition at t12, CMOS sensor cell 0 will begin to accumulate charge at a rate corresponding to the design characteristics of CMOS sensor cell 0.

CMOS sensor cell 0 accumulates charge until time t14, where addr again has the value of 0 and reset again has the value of 3, thereby allowing the value of rowgen to pass through AND gate 38 and the value of rstgen to pass through AND gate 52, respectively, to CMOS sensor cell 0.

At time t14, the rowgen signal undergoes a low to high transition which is reflected by row 0 of CMOS sensor cell 0, to cause CMOS sensor cell 0 to place its stored charge onto data out line 60. Thus, the exposure period for CMOS sensor cell 0 would be period T15, as shown in FIG. 4.

Figure 5:
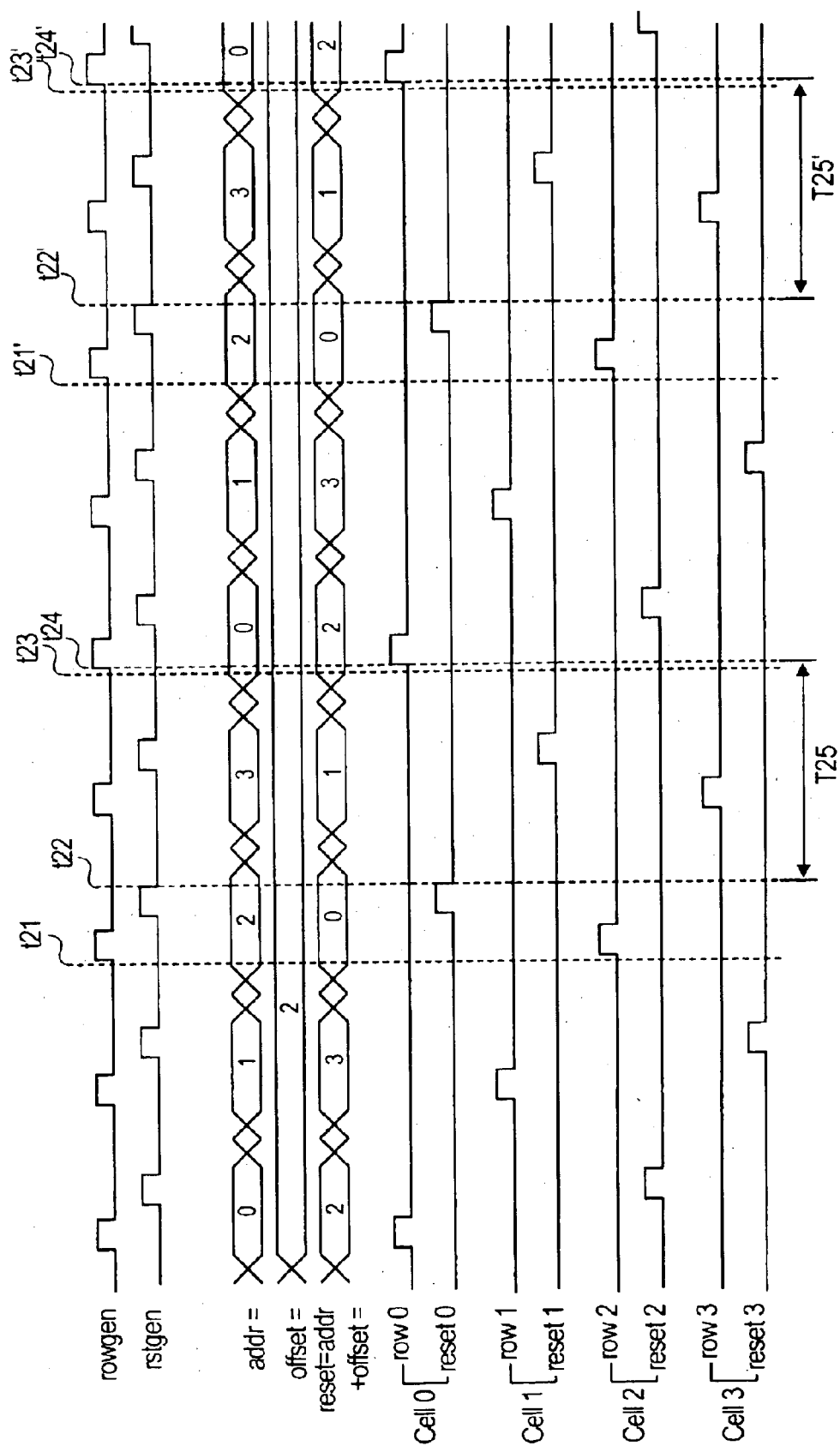

Referring to FIG. 5, where the offset value is now 2, the period of exposure for CMOS sensor cell 0 has been shortened to period T25.

Figure 6:
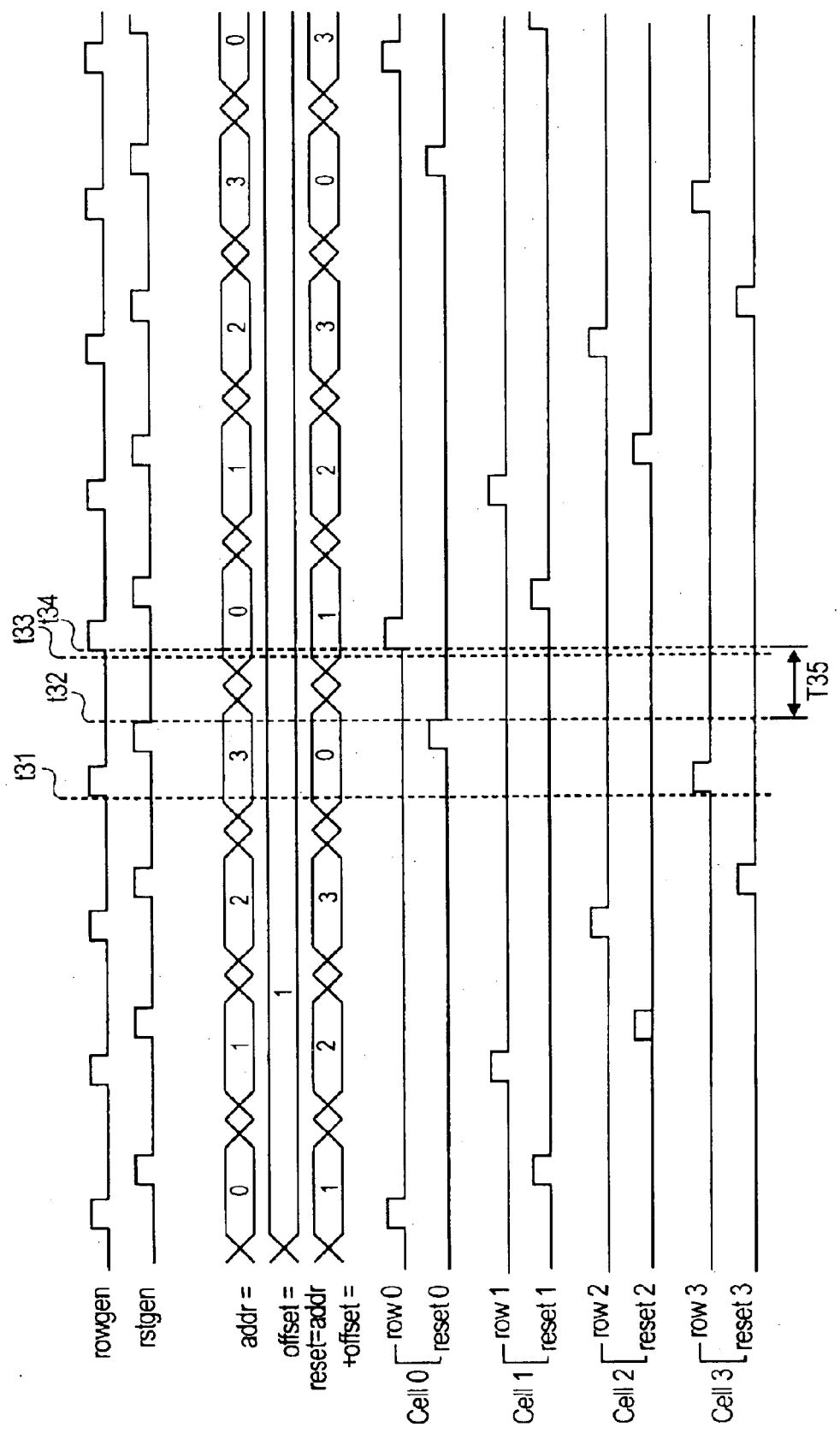

Referring to FIG. 6, the period of sampling for CMOS sensor cell 0 is shortened further to period T35 when the offset value is set to 1.

Figure 7:
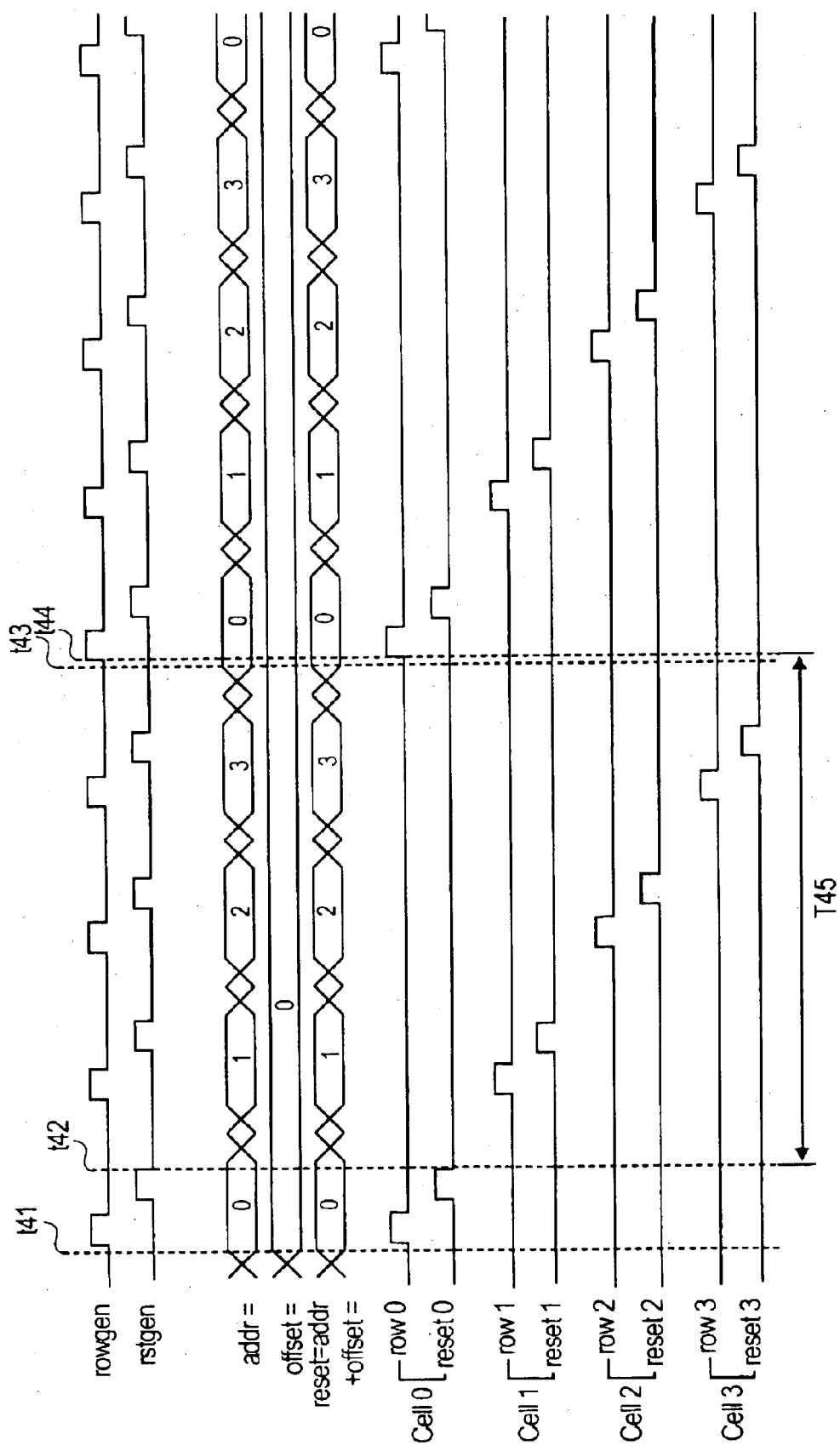

Referring to FIG. 7, when the offset value of zero is used, the period of exposure of CMOS sensor cell 0 is at its maximum period of period T45.

It is to be noted that the function of the preferred embodiment of the present invention is exactly the same in FIGS. 4–7 with differences between the timing/signal diagram resulting from the various offset values that are used.

Figure 8:
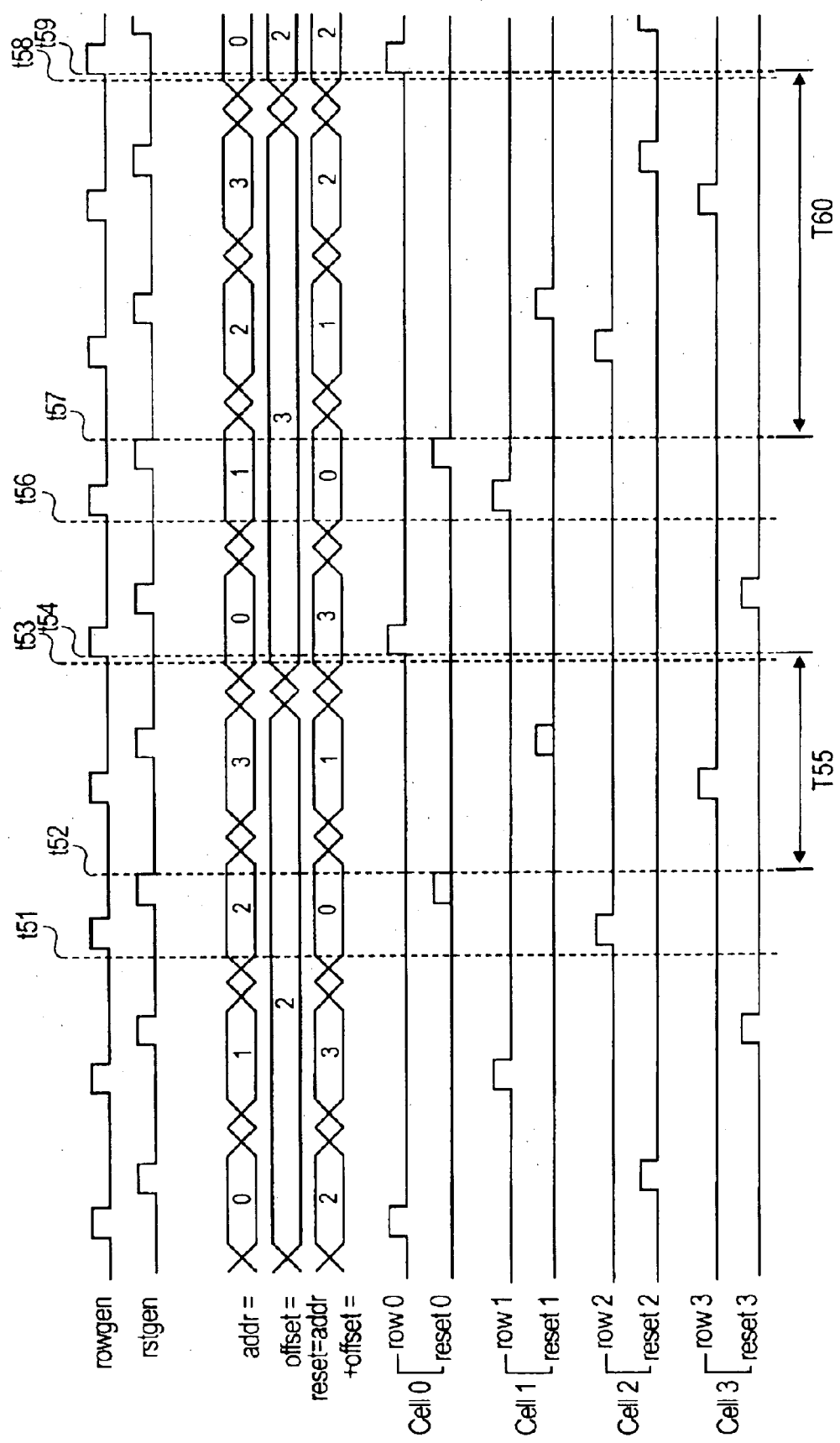

In FIG. 8, a situation is illustrated where the offset value is changed from 2 to 3, thereby dynamically increasing the period of exposure of CMOS sensor cell 0 from period T55 to period T60.

Although in FIG. 8 the offset value is shown as being increased from 2 to 3, in other cases the offset value can be increased or decreased from any first value to any second value. Also, a different offset value can be used for each clock cycle, resulting in a very exact control of exposure time (on a per row For alternate embodiments, the exposure time might be required to be longer than the clock speed will allow (i.e., in cases where there needs to be more than 4 clock cycles between the reset and addressing of all rows). In that alternate embodiment, the generation of a rowgen signal can be delayed for any required amount of time by adding a delay circuit, and thereby allowing the exposure time to be as large as necessary for the CMOS sensor cell array to capture the necessary charge.

In addition, although in FIGS. 4–8 the order of generation of the rowgen signal pulses and the rstgen signal pulses are of a certain configuration, in other embodiments, this configuration can be different. The sole difference would be that the timing/signal diagrams of FIGS. 4–8 would be changed to effect the different periods associated with different offset values.

Moreover, as technology progresses to allow economical and feasible manufacture of higher-speed post-capture circuitry, the present invention is capable of supporting the control of exposure time for higher frame rates (i.e., the present invention is capable of supporting very short exposure time). For example, where frame rates are on the order of hundreds, or even thousands of frames per second, the present invention would be capable of supporting the short exposure times necessary to capture each frame.

Figure 9:
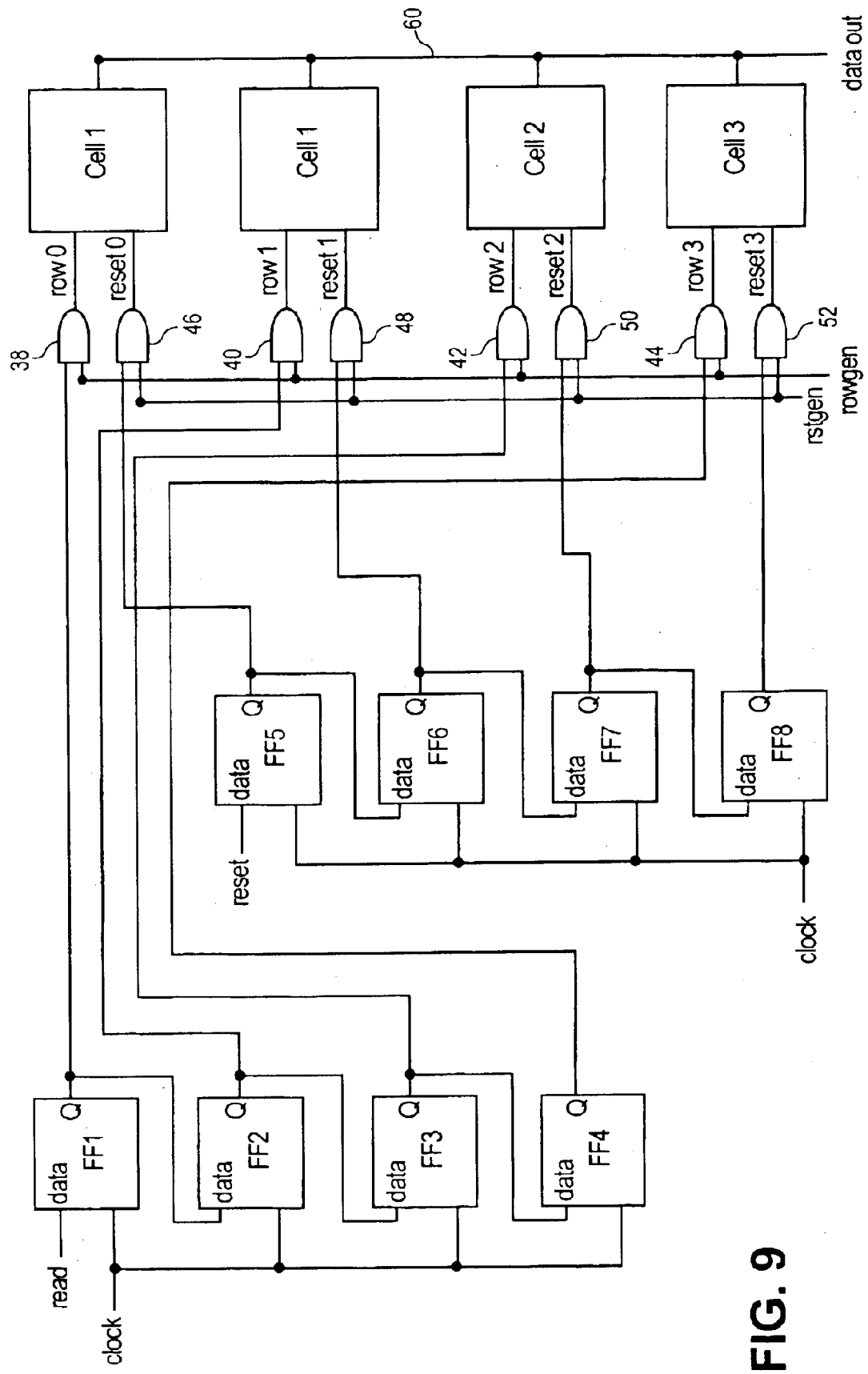
FIG. 9 illustrates a block diagram of a second embodiment of the present invention.

FIG. 9 illustrates a second circuit configured in accordance with the current invention including a set of flip FLOPS FF1–FF8 coupled to AND gates 30, 40, 42, 44, 46, 48, 50 and 52.

In this alternate embodiment, each one of flip flops FF1–FF8 receive a clock signal with a specific cycle. Flip flops FF1–FF8 are intended to represent standard flip flops which are well known in the art. Thus, when a flip flop receives a pulse in its clock input, the flip flop will load a new value from its data input, while discarding the previous value it contained. After the new value is loaded, the new value is output on output Q of the flip flop.

The Q output of each one of flip flops FF1–FF4 are coupled to one of the inputs of AND gates 38, 40, 42, and 44, respectively. Flip flops FF1–FF4 are used to control the reading of the charge contained in CMOS sensor cells 0–3, respectively, out onto data out line 60 as described below.

The Q output of each one of flip flops FF5–FF8 are coupled to one of the inputs of AND gates 46, 48, 50, and 52, respectively. Flip flops FF5–FF8 are used to control the reset of the charges contained in CMOS sensor cells 0–3, respectively, as described below.

Flip Flops FF1–FF4 and FF5–FF8 are coupled in two "one-hot"serial flip flop configurations—i.e., a read one-hot flip flop series and a reset one-hot flip flop series, respectively. Thus, the Q output of each of flip flops FF1–FF3 is coupled to the data input of one of the down stream flip flops FF2–FF4 (e.g., the Q output of flip flop FF1 is coupled to the data input of flip flop FF2, and so on). Flip flops FF5–FF8 are similarly coupled.

The configuration is termed "one-hot" as, for most operations, there is usually only one flip flop in the series outputting a logical "1" value. This is due to the fact that after the clock pulse during which a logical "1" is supplied to the data input of the "head" flip flop of the one-hot series (e.g., flip flops FF1 or FF5), the data input of the head flip flop in the series is kept at a logical "0" until the logical "1" has "washed-though" every flip flop in the series. This ensures that only a single logical "1" is in the particular one-hot series.

However, there is no requirement" that the data input to the head flip flop be kept at a logical "0" value until no flip flop in the series contains a logical "1". Two logical "1"'s can be placed into the read series, separated by one or more clock pulses, to read out a sum of the charges contained in two cells. The sum can then be averaged to obtain an average value over two Clock cycles.

Moreover, in some designs, particularly where the number of flip flop in the series is long enough so that waiting the required clock pulses for the first logical "1" to completely pass through the series would be impracticable (e.g., the time it takes for one logical "1" value to pass through the series would be too long compared to the desired frame rate), one or more additional series can be added to each of the read and reset series so that the array can be divided into two or more portions that can be processed in parallel.

Continuing to refer to FIG. 9, the operation of the second embodiment of the invention will now be described. As described above during the discussion of the operation of the preferred embodiment of the present invention, a rstgen signal or a rowgen signal will be allowed to reach a CMOS sensor cell only if the respective AND gate of the CMOS sensor cell is enabled by flip flops FF5–FF8 or flip flops FF1–FF4, respectively.

Thus, for example, only when flip flop FF6 contains a logical "1", thereby outputting a logical "1" on its output Q, will a rstgen be allowed to pass through AND gate 48.

To allow variable delay in the period between the reset and the sampling of the charge contained in each of the CMOS sensor cells 0–3 in this alternate embodiment, a logical "1" is provided to the reset signal line coupled to the data input of flip flop FF5. Then, after a predetermined number of clock pulses, a "1" is provided to the read signal line coupled to the input of flip flop FF1.

For example, if a delay of two clock cycles were desired between the time of the resetting of the CMOS sensor cells and the reading out of the charges contained in each of the CMOS sensor cells, a logical "1" would be provided on reset signal line and thus be loaded into flip flop FF5 on the first clock pulse. Immediately after the logical "1" is stored in flip flop FF5, AND gate 46 will allow a rstgen signal to pass through to CMOS sensor cell 0, thereby resetting CMOS sensor cell 0.

At the second clock pulse, flip flop FF6 will read the output "Q", of flip flop FF5, which in this case is a logical "1", and store that value while also providing a logical "1" on output Q of flip flop FF6.. Also during the second clock pulse, but after flip flop FF6 has stored the logical "1" contained in flip flop FF5 during the first clock pulse, flip flop FF5 will store the value at its input, which, during this second clock pulse, is a logical "0". Therefore, flip flop FF5 contains a logical "0" and flip flop FF6 contains a logical "1" after clock pulse two and before clock pulse three. Similar to the operation of flip flop FF5 during the first clock pulse, flip flop FF6 will output a logical "1" on its output Q to AND gate 48, which will allow a rstgen signal to reach CMOS sensor cell 1. As flip flop FF5 now contains a logical "0", flip flop FF5 will output a logical "0" on its output Q to AND gate 46, preventing a rstgen signal to reach CMOS sensor cell 0.

At the third clock pulse 3, flip flop FF7 will receive the value contained in flip flop FF6, which is a logical "1". Flip flop FF6 will receive the value contained in flip flop FF5, which in this case is a logical "0", and flip flop FF5 will receive the input contained on the reset line, a logical "0". Therefore, after the third clock pulse, the values stored in flip flops FF5, FF6 and FF7 would be the logical values "0", "0" and "1".

Still during the third clock pulse, a logical "1" is placed on the read line coupled to the data input of flip flop FF1.

Flip flop FF1 then stores the logical "1" and outputs the value on its Q output to AND gate 38, thereby allowing a rowgen signal to pass through to CMOS sensor cell 0. CMOS sensor cell 0 will output its charge on data out line 60. Thus, a delay of two clock cycles is achieved by first placing a logical "1" on the data input of flip flop FF5 during the first clock pulse and then, during the third clock pulse, placing a logical "1" into the data input of flip flop FF1.

As the resetting and reading of the CMOS sensor cells are controlled in this fashion, a variable period of delay is achieved by the number of clock cycles between which a logical "1" is placed on the reset line and which a logical "1" is placed on the read signal line. It is to be noted that any desired period of delay between the resetting and reading of the charge contained in the CMOS sensor cell can be achieved simply by waiting the desired number of clock cycles between the provision of the logical "1" values to the reset signal line and read signal line, respectively.

As discussed above, the delay is based on the required exposure time, as determined by methods which are well known to those skilled in the art. Also, it is to be noted that the circuit providing the logical "1" values to the read and reset lines can be implemented in a variety of ways. For example, a state machine can be used to generate the signals. Another example would be a programmable logic array. Still another example would be a microcontroller. Yet another example would be a microprocessor coupled to a memory configured to control the generation of the signals according to a look-up table or a specific formula.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for controlling a sensor array containing a first group of sensor cells, comprising:

receiving a clock signal and generating a first address value based on the clock signal;

generating a reset signal to said first group of sensor cells based on said first address value;

determining a delay value based on said first address value and and offset value;

generating a read signal to said first group of sensor cells in accordance with said delay value; and then sampling a charge contained in each sensor cell in said first group; and changing an exposure time for the array by changing the offset value, wherein the offset value is an n bit binary number.

2. The method of claim 1 wherein said generating a reset signal includes generation of said reset signal to a second group of sensor cells based on said first address value.

3. The method of claim 1 wherein said generating a read signal includes generation of said read signal to a second group of sensor cells in accordance with said delay value.

4. The method of claim 1 wherein the determination of the delay value includes adding the offset value to the first address value.

5. The method of claim 4 wherein the generation of the read signal includes decoding the first address value to qualify the readout of only the first group in the array.

6. The method of claim 5 wherein the generation of the reset signal includes decoding the sum of (1) the offset value and (2) the first address value, to qualify the reset of only the first group of sensor cells in the array.

7. An apparatus for controlling a sensor array containing a first line of sensor cells arranged in a linear fashion, comprising:
- a first logic circuit for receiving a clock signal and to generate a first address, wherein said first logic circuit comprises an address generation circuit to provide said first address as a binary sequence whose value changes in response to each cycle of the clock signal and points to a line of sensor cells in the array, the binary sequence spans the entire sensor array in a single frame;
- a second logic circuit coupled to said first logic circuit to generate a line reset signal to said first line of sensor cells based on said first address;
- a third logic circuit coupled to said first logic circuit to receive said first address and to calculate a line read delay based on said first address and based on an offset value; and
- a fourth logic circuit coupled to said first logic circuit to generate a line read signal to said first line of sensor cells after said line read delay, to enable the sampling of a charge contained in each sensor cell in said first line of cells.

8. The apparatus of claim 7, wherein said second logic circuit comprises a first address decoder.

9. The apparatus of claim 7, wherein said third logic circuit comprises an adder.

10. The apparatus of claim 7, wherein said fourth logic circuit comprises a second address decoder.

11. The apparatus of claim 7 further comprising logic circuitry to (1) qualify the resetting of a line in the array by an output of the second address decoder, and (2) qualify the reading of a second line in the array by an output of the first address decoder.

12. The apparatus of claim 7 further comprising the sensor array having a plurality of lines of sensor cells connected such that (1) all of the sensor cells in the first line simultaneously receive the reset signal, and (2) all of the sensor cells in the first line simultaneously receive the read signal.

13. A method for controlling a CMOS sensor array containing a first CMOS sensor cell, comprising:
- receiving a clock signal and generating a first address;
- generating a reset signal to said first CMOS sensor cell based on said first address;
- calculating a read delay based on said first address and an offset value; and,
- generating a read address signal to said first CMOS sensor cell after said read delay.

14. The method of claim 13, wherein generating a reset signal includes generation of said reset signal to a second CMOS sensor cell based on said first address.

15. The method of claim 13, wherein generating a read address signal includes generation of said read address signal to a second CMOS sensor cell after said read delay.

16. An apparatus for controlling a CMOS sensor array containing a first CMOS sensor cell, comprising:
- a first logic circuit for receiving a clock signal and generating a first address;
- a second logic circuit coupled to said first logic circuit for receiving said first address and generating a reset signal to said first CMOS sensor cell based on said first address;
- a third logic circuit coupled to said first logic circuit for receiving said first address and calculating a read delay based on said first address and an offset value; and,
- a fourth logic circuit coupled to said first logic circuit for generating a read address signal to said first CMOS sensor cell after said read delay.

17. The apparatus of claim 16, wherein first logic circuit comprises an address generator.

18. The apparatus of claim 16, wherein said second logic circuit comprises a first address decoder.

19. The apparatus of claim 16, wherein said third logic circuit comprises an adder.

20. The apparatus of claim 16, wherein said fourth logic circuit comprises a second address decoder.

21. A method for controlling a CMOS sensor array containing a first CMOS sensor cell, comprising:
- receiving a first clock signal and in response storing a first address;
- generating a reset signal to said first CMOS sensor cell based on said first address; and then
- waiting a predetermined number of clock cycles;
- receiving a second clock signal and in response storing a second address; and,
- generating a read address signal to said first CMOS sensor cell based on said second address after said predetermined number of clock cycles.

* * * * *

UNITED STATES PATENT AND TRADEMARK OFFICE
CERTIFICATE OF CORRECTION

PATENT NO. : 6,856,349 B1
DATED : February 15, 2005
INVENTOR(S) : Trevino

It is certified that error appears in the above-identified patent and that said Letters Patent is hereby corrected as shown below:

Column 2,
Line 20, delete "acces" and insert -- access --.

Column 3,
Line 10, after "all" insert -- of --.

Column 4,
Line 43, after "generating" insert -- the --.

Column 8,
Line 65, before "requirement" insert -- " --.

Signed and Sealed this

Twenty-first Day of June, 2005

JON W. DUDAS
*Director of the United States Patent and Trademark Office*